(12) United States Patent
Hu

(10) Patent No.: US 12,416,084 B2
(45) Date of Patent: Sep. 16, 2025

(54) COATING-FREE ANTIMICROBIAL STAINLESS STEEL SURFACES

(71) Applicant: Goodrich Corporation, Charlotte, NC (US)

(72) Inventor: Jin Hu, Hudson, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 806 days.

(21) Appl. No.: 17/562,194

(22) Filed: Dec. 27, 2021

(65) Prior Publication Data

US 2023/0203666 A1 Jun. 29, 2023

(51) Int. Cl.
*C23C 22/06* (2006.01)
*C22C 38/18* (2006.01)
*C23C 22/50* (2006.01)
*C23C 22/78* (2006.01)

(52) U.S. Cl.
CPC .............. *C23C 22/06* (2013.01); *C22C 38/18* (2013.01); *C23C 22/78* (2013.01)

(58) Field of Classification Search
CPC ..................................................... C23C 22/00
See application file for complete search history.

(56) References Cited

U.S. PATENT DOCUMENTS 10,154,668 B2 12/2018 Porosa et al.

FOREIGN PATENT DOCUMENTS

| CA | 3055070 | * 11/2018 | .......... H01M 8/021 |
|---|---|---|---|
| CN | 104593761 A | 5/2015 | |
| CN | 105802293 A | 7/2016 | |
| CN | 106947978 A | 7/2017 | |
| CN | 113430509 A | 9/2021 | |
| EP | 2137339 A1 | 12/2009 | |
| EP | 4015585 A1 | 6/2022 | |
| WO | 2008130078 A1 | 10/2008 | |

OTHER PUBLICATIONS

European Search Report for Application No. 22212281.4, mailed May 23, 2023, 9 pages.
Machine Translation of CN105802293, Published Jul. 27, 2016, 15 pages.
Machine Translation of CN106947978, Published: Jul. 14, 2017, 7 pages.

* cited by examiner

*Primary Examiner* — Lois L Zheng
(74) *Attorney, Agent, or Firm* — CANTOR COLBURN LLP

(57) ABSTRACT

Disclosed is a method of manufacturing a stainless steel component, the method including texturizing a stainless steel substrate by bead blasting to provide a texturized stainless steel. The stainless steel substrate includes grade 316 austenitic stainless steel. The method also includes treating the texturized stainless steel with a passivation solution to provide a passivated stainless steel. The method further includes treating the passivated stainless steel with an oxidizing solution including sulfuric acid and hydrogen peroxide at a temperature of about 130 to about 200 degrees Fahrenheit for at least 50 minutes to provide an antimicrobial stainless steel surface that is free of a separate coating. The method includes obtaining at least 99.9% *E. coli* reduction as measured by JIS Z 2801:2010 test on the antimicrobial stainless steel without a separate coating.

20 Claims, 4 Drawing Sheets

COATING-FREE ANTIMICROBIAL STAINLESS STEEL SURFACES

BACKGROUND

Embodiments pertain to antimicrobial surface treatments, in particular, coating-free antimicrobial stainless steel surfaces and treatments.

Mold and contamination of bacteria and virus on stainless steel surfaces (e.g., faucets) can cause the faucet water to fail standard bacterial contamination tests. Further, mold may form and combine with the accumulated bacteria. Such bacterial accumulation can negatively impact the safety of the aircraft passengers and crew members.

The stainless-steel surfaces of the aircraft, both interior and exterior surfaces, can be treated with various treatments to mitigate the presence of the bacteria, virus and mold on such surfaces. For example, nano-silver based coatings or surface treatments are effective as antimicrobials as they suppress or inhibit growth of a wide spectrum of bacteria, mold, fungi, and viruses. In addition, silyl quaternary ammonium coatings are used as effective antimicrobial coatings on stainless steel surfaces.

BRIEF DESCRIPTION

Disclosed is a method of manufacturing a stainless steel component, the method including texturizing a stainless steel substrate by bead blasting to provide a texturized stainless steel. The stainless steel substrate includes grade 316 austenitic stainless steel. The method also includes treating the texturized stainless steel with a passivation solution to provide a passivated stainless steel. The method further includes treating the passivated stainless steel with an oxidizing solution including sulfuric acid and hydrogen peroxide at a temperature of about 130 to about 200 degrees Fahrenheit for at least 50 minutes to provide an antimicrobial stainless steel surface that is free of a separate coating. The method includes obtaining at least 99.9% *E. coli* reduction as measured by JIS Z 2801:2010 test on the antimicrobial stainless steel without a separate coating.

Also disclosed is a method of manufacturing a stainless steel component, wherein the passivation solution comprises a nitric acid solution.

Also disclosed is a method of manufacturing a stainless steel component, wherein treating the texturized stainless steel with the passivation solution includes disposing the texturized stainless steel in a passivation solution bath.

Also disclosed is a method of manufacturing a stainless steel component, wherein the stainless steel substrate is a part of an aircraft lavatory.

Also disclosed is a method of manufacturing a stainless steel component, wherein the stainless steel substrate comprises at least 11 weight % chromium.

Also disclosed is a method of manufacturing a stainless steel component, wherein treating the passivated stainless steel with the oxidizing solution is at a temperature of about 140 to about 150 degrees Fahrenheit.

Disclosed is a method of manufacturing a stainless steel aircraft component, the method including texturizing a stainless steel substrate by brushing to provide a texturized stainless steel The stainless steel substrate includes grade 316 austenitic stainless steel. The method further includes treating a surface of the texturized stainless steel component with a passivation solution to provide a passivated stainless steel, and the passivation solution includes nitric acid. The method also includes treating the passivated surface with an oxidizing solution at a temperature of about 130 to about 200 degrees Fahrenheit for at least 10 minutes to provide an antimicrobial stainless steel surface that is free of a separate coating. The oxidizing solution includes concentrated sulfuric acid (95-98%) and concentrated hydrogen peroxide (30%). The method further includes obtaining at least 99.9% *E. coli* reduction as measured by JIS Z 2801:2010 test on the antimicrobial stainless steel without a separate coating.

Also disclosed is a method of manufacturing a stainless steel component, wherein the passivation solution includes 25% nitric acid solution.

Also disclosed is a method of manufacturing a stainless steel component, wherein treating the texturized stainless steel with the passivation solution includes disposing the texturized stainless steel in a passivation solution bath.

Also disclosed is a method of manufacturing a stainless steel component, wherein the stainless steel component is a part of an aircraft lavatory.

Also disclosed is a method of manufacturing a stainless steel component, wherein the stainless steel component comprises at least 11 weight % chromium.

Also disclosed is a method of manufacturing a stainless steel component, wherein treating the passivated stainless steel with the oxidizing solution is at a temperature of about 140 to about 150 degrees Fahrenheit.

Disclosed is a method of manufacturing a stainless steel aircraft component, the method including texturizing a stainless steel substrate by brushing to provide a texturized stainless steel. The stainless steel substrate includes grade 304 austenitic stainless steel. The method further includes treating a surface of the texturized stainless steel component with a passivation solution to provide a passivated stainless steel, and the passivation solution includes nitric acid. The method also includes treating the passivated surface with an oxidizing solution at a temperature of about 130 to about 200 degrees Fahrenheit for at least 50 minutes to provide an antimicrobial stainless steel surface that is free of a separate coating. The oxidizing solution includes a ratio of the concentrated sulfuric acid (95-98%) to the concentrated hydrogen peroxide (30%) of about 2 to about 4 to 1 (2-4:1). The method also includes obtaining at least 99.9% *E. coli* reduction as measured by JIS Z 2801:2010 test on the antimicrobial stainless steel without a separate coating.

Also disclosed is a method of manufacturing a stainless steel component, wherein the passivation solution includes 25% nitric acid solution.

Also disclosed is a method of manufacturing a stainless steel component, wherein treating the texturized stainless steel with the passivation solution includes disposing the texturized stainless steel in a passivation solution bath.

Also disclosed is a method of manufacturing a stainless steel component, wherein the stainless steel component is a part of an aircraft lavatory.

Also disclosed is a method of manufacturing a stainless steel component, wherein the stainless steel component comprises at least 11 weight % chromium.

Also disclosed is a method of manufacturing a stainless steel component, wherein treating the passivated stainless steel with the oxidizing solution is at a temperature of about 140 to about 150 degrees Fahrenheit.

Also disclosed is a method of manufacturing a stainless steel component, wherein treating the passivated surface with an oxidizing solution is for at least 60 minutes.

Also disclosed is a method of manufacturing a stainless steel component, wherein at least 99.99% *E. coli* reduction is obtained.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

While nano-silver based coatings provide antimicrobial properties to stainless-steel surfaces, they are expensive and present significant environmental challenges. Further, antimicrobial silyl quaternary ammonium coating solutions present application challenges, as they will drip from three-dimensional surfaces that are not sufficiently adsorbent, which results in uneven coatings. Any type of discrete antimicrobial coating applied to a metallic surface can abrade into the water, including drinking water.

Accordingly, described herein are methods of treating stainless steel surfaces and treating and manufacturing stainless steel components with an oxidizing solution (e.g., a sulfuric acid and hydrogen peroxide solution), which provide an antimicrobial surface without an additional coating. The stainless steel surfaces are initially passivated for corrosion protection. They are subsequently treated with oxidizing concentrated sulfuric acid and concentrated hydrogen peroxide formulations to provide greater than 99.9% bacteria reduction, compared to passivated only stainless steel controls in some embodiments. Treating passivated stainless steel surfaces with only the oxidizing sulfuric acid and hydrogen peroxide solutions, and without any separate discrete coating, eliminates the risk of uneven coatings, dripping during application, as well as coating abrading into water to be consumed or used. Further, the oxidizing treatments can be easily applied to any internal or three-dimensional structure in an aircraft, medical device, or even in a household component, such as inside a stainless steel faucet. The treatments also do not impact the corrosion resistance of the passivated stainless steel. Such a process is easily industrialized on a large scale.

Figure 1:
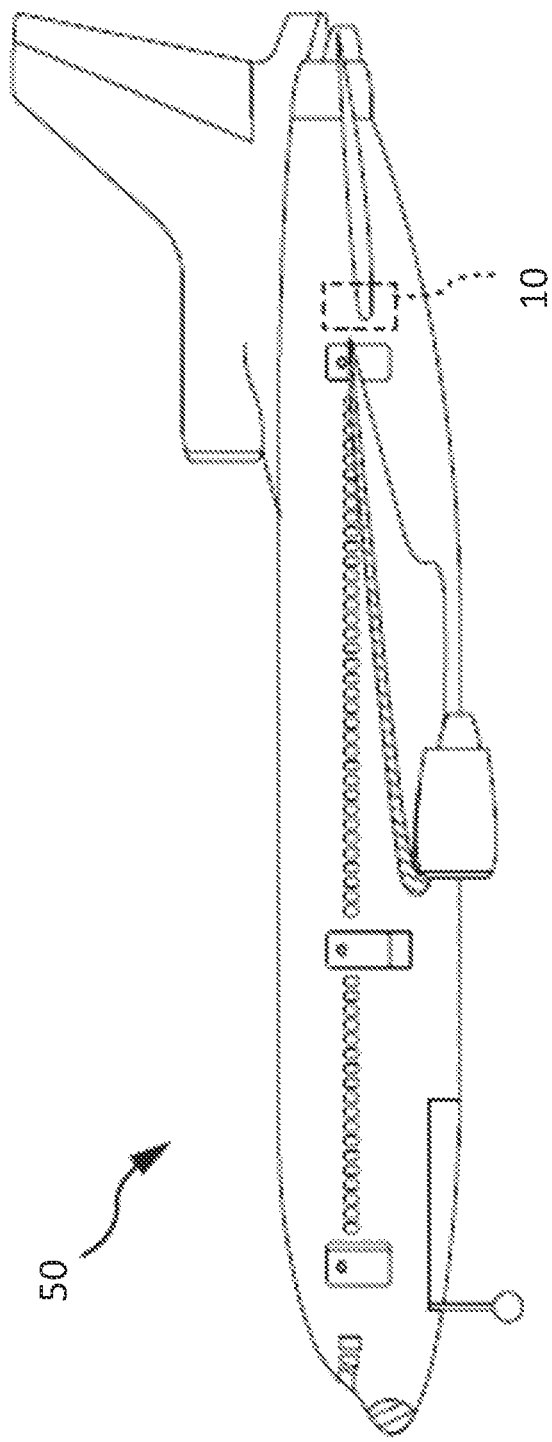
FIG. 1 illustrates an aircraft with a lavatory in accordance with various embodiments.
Figure 2:
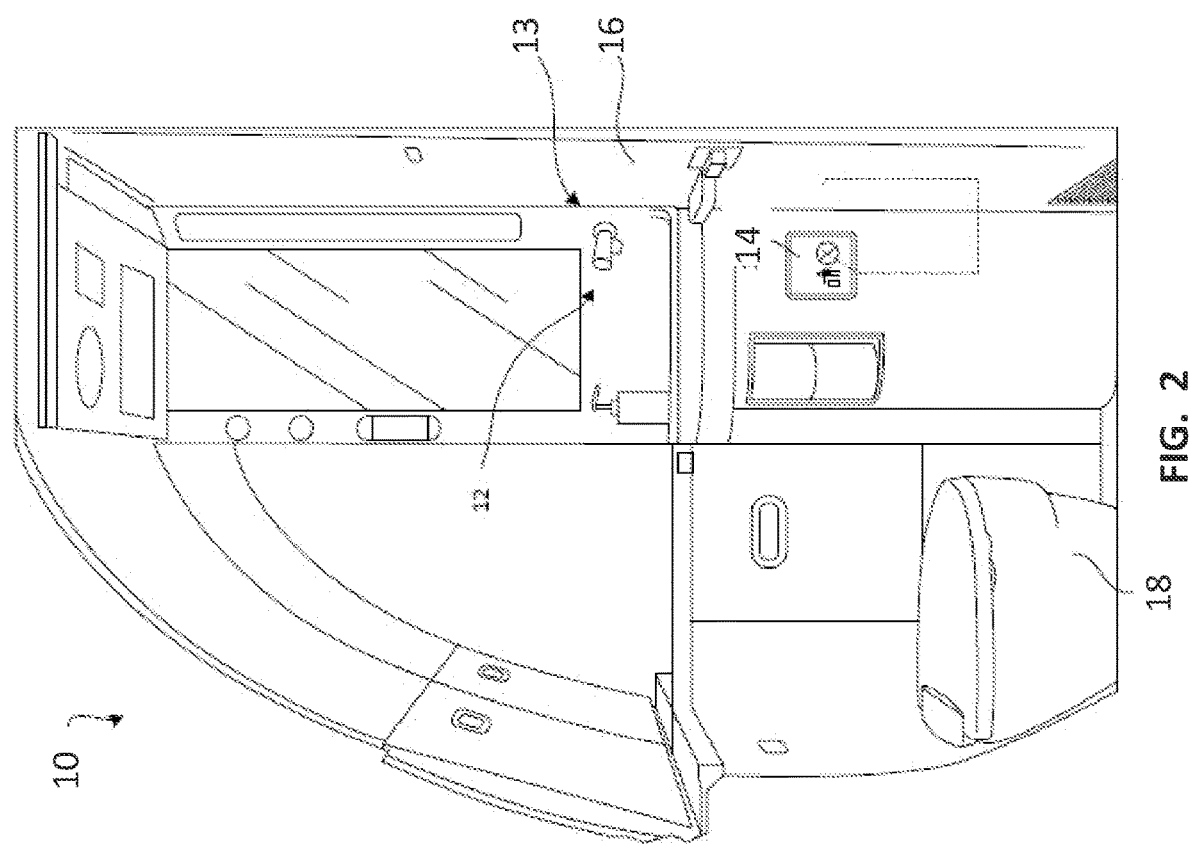
FIG. 2 illustrates a perspective view of an aircraft lavatory in accordance with various embodiments.

In various embodiments, and with reference to FIGS. 1 and 2, an aircraft 50 includes aircraft lavatory 10. The aircraft lavatory 10 includes various stainless steel lavatory components including a washbasin (e.g., a sink) 12 with a faucet system 13, a trash receptacle 14, a door 16, and a toilet 18, among other features. The faucet system 13 includes a faucet component such as a faucet manifold that includes one or more solenoid valves in hot and/or cold water lines, and an aerator. The faucet system 13 includes several joints, often around a respective aerator joint. Bacteria and viruses may contaminate the aerator, and in particular, bacteria and viruses may grow on nearby interior walls of the faucet system 13. In this regard, typical faucet systems 13 may be susceptible to mold growing in or around faucet joints. Thus, the antimicrobial surface treatment systems and methods disclosed herein and described in greater detail below may have various health, safety, and aesthetic benefits over conventional faucet systems. The parts shown in FIGS. 1 and 2, including the faucet system 13, trash receptacle 14, door 16, sink 12, and toilet 18 include metallic or stainless steel surfaces.

Figure 3:
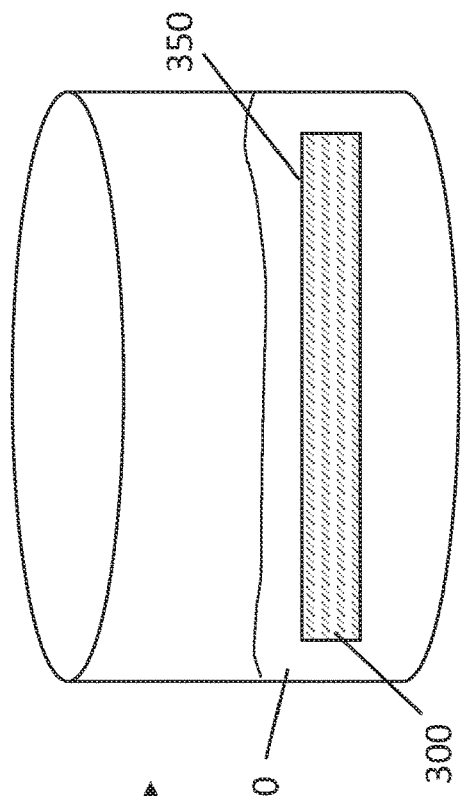
FIG. 3 illustrates a surface portion of a component after treating with nitric acid to provide an antimicrobial coating-free surface according to embodiments.
Figure 3:
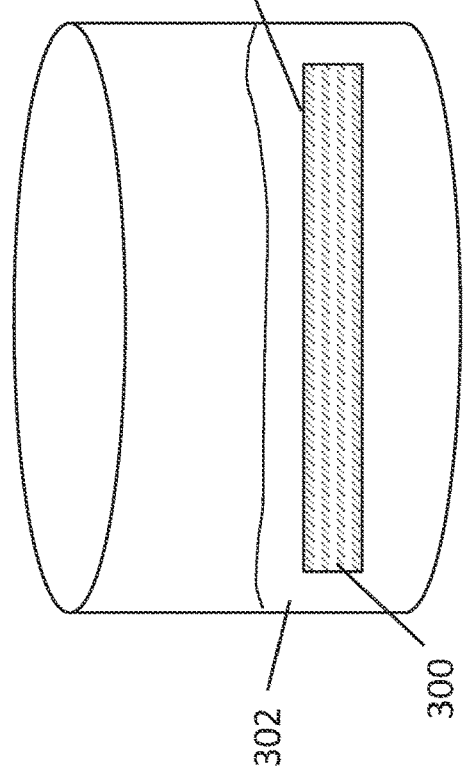

FIG. 3 illustrates a method for treating a stainless steel component 300 with a passivation solution (e.g., nitric acid) followed by an oxidizing solution (e.g., concentrated sulfuric acid and concentrated hydrogen peroxide) to provide an antimicrobial coating-free stainless steel surface according to embodiments. The component 300 includes a stainless steel substrate surface 304. The component 300 is part of an aircraft, household, or industrial system. In embodiments, the component 300 is a lavatory component, a faucet, faucet component, part of a faucet system, a trash receptacle, a door, a door handle, a valve, a sink, a toilet, or a medical device.

The stainless steel in the stainless steel substrate surface 304 includes at least 11 weight % chromium. In one or more embodiments, the stainless steel surface 304 includes about 11 to about 20 weight % chromium. Non-limiting examples of stainless steel include austenitic stainless steel, ferritic stainless steel, martensitic stainless steel, duplex stainless steel, precipitation hardening stainless steel, or a combination thereof. In one or more embodiments, the stainless steel includes 16% chromium, 10% nickel, and 2% molybdenum (i.e., grade 316 austenitic stainless steel). In some embodiments, the stainless steel includes 18% chromium and 8% nickel (i.e., austenitic grade 304 stainless steel). In embodiments, the stainless steel is corrosion resistant. The stainless steel substrate surface 304 is prepared to have any surface texture. For example, the stainless steel surface is prepared by one or more texturizing processes, including brushing, milling, machining, bead-blasting, or a combination thereof. In one or more embodiments, the stainless steel is bead-blasted grade 316 austenitic stainless steel, brushed grade 316 austenitic stainless steel, brushed grade 304 austenitic stainless steel, or bead-blasted grade 304 austenitic stainless steel.

The stainless steel substrate surface 304 (also referred to as a stainless steel substrate) is treated by disposing in a passivation bath solution 302 per AMS 2700. In some embodiments, the passivation bath solution 302 is a 25 volume % % nitric acid solution. In other embodiments, the passivation bath solution 302 is a citric acid bath solution.

In one or more embodiments, the stainless steel surface 304 is treated with the passivation bath solution for a time of about 20 to about 30 minutes and at a temperature of about 120 to about 140 degrees Fahrenheit. After passivation, the bath is allowed to cool to room temperature, and the substrates are then washed with de-ionized water three times.

After passivating the stainless steel substrate surface 304, the surface is treated with an oxidizing solution 310 that includes concentrated sulfuric acid and concentrated hydrogen peroxide. In one or more embodiments, the oxidizing solution includes about 3 to about 1 ratio (3:1 ratio) mixture of concentrated sulfuric acid (about 95 to about 98%) to concentrated hydrogen peroxide (about 30%). In other embodiments, the oxidizing solution includes about 2-4 to about 1 ratio (2-4:1 ratio) mixture of concentrated sulfuric acid to concentrated hydrogen peroxide. After treatment with the oxidizing solution, the stainless steel surface is washed to remove excess sulfuric acid and hydrogen peroxide. In one or more embodiments, the stainless steel surface is washed with water, then by covering with water for 8-12 hours.

The stainless steel substrate surface is treated with the oxidizing solution under conditions that are varied depending on the type of stainless steel surface and the stainless steel component, as well as surface texture. In one or more embodiments, the stainless steel substrate surface 304 is treated with the nitric acid solution by disposing, at least partially, the stainless steel component in the oxidizing solution 310, as shown in FIG. 3.

The passivated stainless steel surface is treated with the oxidizing solution for a time and under a temperature that is varied and depends on the stainless steel and component. In one or more embodiments, the passivated surface is treated with the oxidizing solution for at least 10 minutes, at least 20 minutes, at least 30 minutes, at least 40 minutes, or at least 50 minutes. In other embodiments, the passivated surface is treated with the oxidizing solution for a time of about 10 minutes to about 60 minutes. In some embodiments, the passivated stainless steel surface is treated with the oxidizing solution for a time about or in any range between about 10, 15, 20, 25, 30, 35, 40, 45, 50, 55, 60, 65, 70, 75, 80, 85, and 90 minutes.

In one or more embodiments, the passivated stainless steel surface is treated with the oxidizing solution at a temperature of about 130 to about 200 degrees Fahrenheit. In other embodiments, the passivated stainless steel surface is treated with the oxidizing solution at a temperature of about 135 to about 200 degrees Fahrenheit. In some embodiments, the passivated stainless steel surface is treated with the oxidizing solution at a temperature about or in any range between about 130, 135, 140, 150, 155, 160, 165, 170, 175, 180, 185, 190, and 200 degrees Fahrenheit. The disclosed treatments provide an antimicrobial stainless steel surface that is free of a separate coating.

Figure 4:
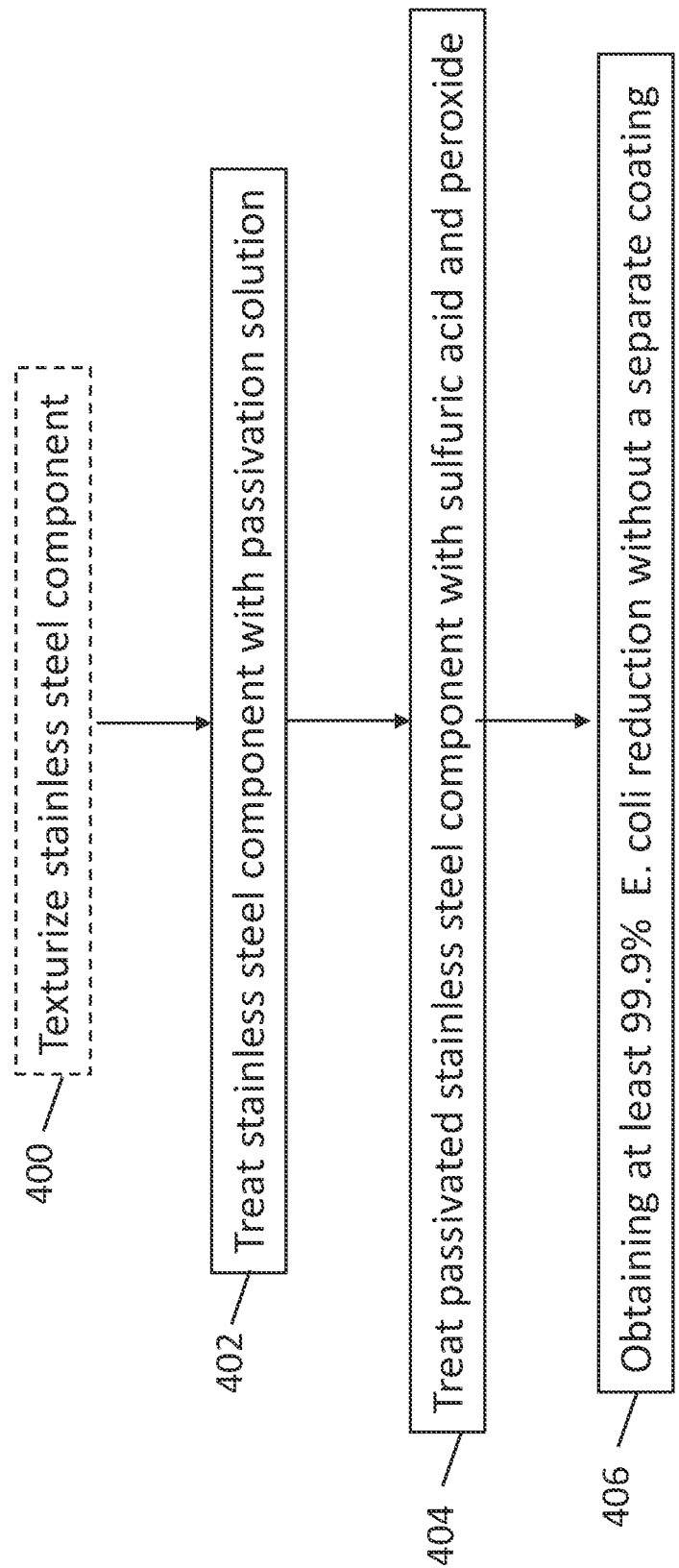
FIG. 4 illustrates a flow diagram of a method for manufacturing and treating a stainless steel component with an antimicrobial coating-free surface according to embodiments.

FIG. 4 illustrates a flow diagram of a method for manufacturing a stainless steel component with an antimicrobial coating-free surface according to embodiments. In box 400, the method includes optionally texturizing the stainless steel component. In box 402, the method includes treating the stainless steel component with a passivation solution. In box 404, the method includes treating the passivated stainless steel component with sulfuric acid and hydrogen peroxide. In box 406, the method includes obtaining at least 99.9% E. coli reduction without a separate coating.

With the described methods, the stainless steel surfaces of components are antimicrobial and without any additional separate antimicrobial coating or film. In one or more embodiments, the stainless steel substrate surface is a homogenous surface without a separate coating or film and is antimicrobial, as evidenced by at least 99.9% E. coli reduction as measured by JIS Z 2801:2010 test. In some embodiments, the surface after treatment reduces E. coli by at least 99.98 or at least 99.99% as measured by JIS Z 2801:2010 test.

In one or more embodiments, a method of manufacturing a stainless steel component with an antimicrobial coating-free surface includes texturizing a grade 316 austenitic stainless steel by bead blasting; treating the texturized stainless steel by disposing in a passivation solution; and treating the passivated stainless steel by disposing in an oxidizing solution of sulfuric acid and hydrogen peroxide for at least 50 minutes and at a temperature of about 130 to about 200 degrees Fahrenheit; and obtaining at least 99.9% E. coli reduction without a separate coating as measured by JIS Z 2801:2010 test.

In other embodiments, a method of manufacturing a stainless steel component with an antimicrobial coating-free surface includes texturizing a grade 316 austenitic stainless steel by brushing; treating the texturized stainless steel by disposing in a passivation solution; and treating the passivated stainless steel by disposing in an oxidizing solution of sulfuric acid and hydrogen peroxide for at least 10 minutes and at a temperature of about 130 to about 200 degrees Fahrenheit; and obtaining at least 99.9% E. coli reduction without a separate coating as measured by JIS Z 2801:2010 test.

In some embodiments, a method of manufacturing a stainless steel component with an antimicrobial coating-free surface includes texturizing a grade 304 austenitic stainless steel by brushing; treating the texturized stainless steel by disposing in a passivation solution; and treating the passivated stainless steel by disposing in an oxidizing solution of sulfuric acid and hydrogen peroxide for at least 60 minutes and at a temperature of about 130 to about 200 degrees Fahrenheit; and obtaining at least 99.9% E. coli reduction without a separate coating as measured by JIS Z 2801:2010 test.

EXAMPLES

Stainless steel coupons with different surface textures were treated with solutions of concentrated sulfuric acid (95-98%) and concentrated hydrogen peroxide (30%) (2:1 V/V) under different treating conditions. The coupons were tested for E. coli reduction according to JIS Z 2801:2010 in comparison with substrate controls. The test results are listed in the Table below.

TABLE 1

E. Coli reduction after treatments

| Stainless steel substrates | Concentrated Sulfuric acid/Concentrated hydrogen peroxide* (2:1 V/V) treatment at 140-150 degrees Fahrenheit (minutes) | E. coli reduction |
|---|---|---|
| SS316 bead blasted - McMaster 88885K24, blasted, nitric acid passivated | 10 minutes | 99.6% |
| SS316 bead blasted - McMaster 88885K24, blasted, nitric acid passivated | 30 minutes | 99.6% |
| SS316 bead blasted - McMaster 88885K24, blasted, nitric acid passivated | 60 minutes | 99.8% |
| SS316 brushed - McMaster 9745K74, nitric acid passivated | 10 minutes | 99.99% |
| SS316 brushed - McMaster 9745K74, nitric acid passivated | 30 minutes | 99.98% |
| SS316 brushed - McMaster 9745K74, nitric acid passivated | 60 minutes | 99.98% |

TABLE 1-continued

E. Coli reduction after treatments

| Stainless steel substrates | Concentrated Sulfuric acid/Concentrated hydrogen peroxide* (2:1 V/V) treatment at 140-150 degrees Fahrenheit (minutes) | E. coli reduction |
|---|---|---|
| SS304 brushed - McMaster 9748K24, nitric acid passivated | 10 minutes | 91% |
| SS304 brushed - McMaster 9748K24, nitric acid passivated | 30 minutes | 99.8% |
| SS304 brushed - McMaster 9748K24, nitric acid passivated | 60 minutes | 99.98% |

*Concentrated Sulfuric acid 95-98%
Concentrated Hydrogen peroxide 30%

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a stainless steel component, the method comprising:
   texturizing a stainless steel substrate by bead blasting to provide a texturized stainless steel, the stainless steel substrate comprising grade 316 austenitic stainless steel;
   treating the texturized stainless steel with a passivation solution to provide a passivated stainless steel;
   treating the passivated stainless steel with an oxidizing solution comprising sulfuric acid and hydrogen peroxide at a temperature of about 130 to about 200 degrees Fahrenheit for at least 50 minutes to provide an antimicrobial stainless steel surface that is free of a separate coating; and obtaining at least 99.9% *E. coli* reduction as measured by JIS Z 2801:2010 test on the antimicrobial stainless steel without a separate coating.

2. The method of claim 1, wherein the passivation solution comprises a nitric acid solution.

3. The method of claim 2, wherein treating the texturized stainless steel with the passivation solution includes disposing the texturized stainless steel in a passivation solution bath.

4. The method of claim 1, wherein the stainless steel substrate is a part of an aircraft lavatory.

5. The method of claim 1, wherein the stainless steel substrate comprises at least 11 weight % chromium.

6. The method of claim 1, wherein treating the passivated stainless steel with the oxidizing solution is at a temperature of about 140 to about 150 degrees Fahrenheit.

7. A method of manufacturing a stainless steel aircraft component, the method comprising:

texturizing a stainless steel substrate by brushing to provide a texturized stainless steel, the stainless steel substrate comprising grade 316 austenitic stainless steel;

treating a surface of the texturized stainless steel component with a passivation solution to provide a passivated stainless steel, the passivation solution comprising nitric acid;

treating the passivated surface with an oxidizing solution at a temperature of about 130 to about 200 degrees Fahrenheit for at least 10 minutes to provide an antimicrobial stainless steel surface that is free of a separate coating, the oxidizing solution comprising concentrated sulfuric acid and concentrated hydrogen peroxide; and obtaining at least 99.9% *E. coli* reduction as measured by JIS Z 2801:2010 test on the antimicrobial stainless steel without a separate coating.

8. The method of claim 7, wherein the passivation solution includes 25% by volume of nitric acid solution.

9. The method of claim 8, wherein treating the texturized stainless steel with the passivation solution includes disposing the texturized stainless steel in a passivation solution bath.

10. The method of claim 7, wherein the stainless steel component is a part of an aircraft lavatory.

11. The method of claim 10, wherein the stainless steel component comprises at least 11 weight % chromium.

12. The method of claim 11, wherein treating the passivated stainless steel with the oxidizing solution is at a temperature of about 140 to about 150 degrees Fahrenheit.

13. A method of manufacturing a stainless steel aircraft component, the method comprising:

texturizing a stainless steel substrate by brushing to provide a texturized stainless steel, the stainless steel substrate comprising grade 304 austenitic stainless steel;

treating a surface of the texturized stainless steel component with a passivation solution to provide a passivated stainless steel, the passivation solution comprising nitric acid;

treating the passivated surface with an oxidizing solution at a temperature of about 130 to about 200 degrees Fahrenheit for at least 50 minutes to provide an antimicrobial stainless steel surface that is free of a separate coating, the oxidizing solution comprising a ratio of the concentrated sulfuric acid to the concentrated hydrogen peroxide of about 2 to about 4 to 1 (2-4:1); and obtaining at least 99.9% *E. coli* reduction as measured by JIS Z 2801:2010 test on the antimicrobial stainless steel without a separate coating.

14. The method of claim 13, wherein the passivation solution includes 25% by volume of nitric acid solution.

15. The method of claim 13, wherein treating the texturized stainless steel with the passivation solution includes disposing the texturized stainless steel in a passivation solution bath.

16. The method of claim 13, wherein the stainless steel component is a part of an aircraft lavatory.

17. The method of claim 13, wherein the stainless steel component comprises at least 11 weight % chromium.

18. The method of claim 13, wherein treating the passivated stainless steel with the oxidizing solution is at a temperature of about 140 to about 150 degrees Fahrenheit.

19. The method of claim 13, wherein treating the passivated surface with an oxidizing solution is for at least 60 minutes.

20. The method of claim 13, wherein at least 99.99% *E. coli* reduction is obtained.

* * * * *